United States Patent
Ryu et al.

(10) Patent No.: US 7,405,799 B2
(45) Date of Patent: Jul. 29, 2008

(54) LIQUID CRYSTAL DISPLAY DEVICE AND METHOD OF MANUFACTURING THE SAME

(75) Inventors: Joung Ho Ryu, Kumi-shi (KR); Hyug Jin Kweon, Kumi-shi (KR); Hae Joon Son, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 347 days.

(21) Appl. No.: 11/003,469

(22) Filed: Dec. 6, 2004

(65) Prior Publication Data

US 2005/0099576 A1 May 12, 2005

Related U.S. Application Data

(62) Division of application No. 10/184,075, filed on Jun. 28, 2002, now Pat. No. 7,196,764.

(30) Foreign Application Priority Data

Mar. 20, 2002 (KR) ................ 2002-15079

(51) Int. Cl.
*G02F 1/1339* (2006.01)
(52) U.S. Cl. .................................... 349/153
(58) Field of Classification Search ............. 349/153, 349/190, 110, 93, 106, 155
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki | |
| 4,775,225 A | 10/1988 | Tsuboyama et al. | |
| 5,016,987 A | * 5/1991 | Smith, Jr. ............... | 349/153 |
| 5,247,377 A | 9/1993 | Omeis | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii | |
| 5,680,189 A | 10/1997 | Shimizu et al. | |

(Continued)

FOREIGN PATENT DOCUMENTS

JP 57038414 3/1982

(Continued)

*Primary Examiner*—Thoi V Duong
(74) *Attorney, Agent, or Firm*—McKenna, Long & Aldridge LLP

(57) ABSTRACT

An LCD device and a method of manufacturing the same are disclosed, which prevents a liquid crystal from being filled imperfectly or excessively in an active region, thereby obtaining a uniform cell gap and improving picture quality characteristics. The LCD device includes a lower substrate and an upper substrate, a UV sealant between the lower and upper substrates, the UV sealant having a portion for controlling a liquid crystal flow at four corner regions, and a liquid crystal layer between the lower and upper substrates.

8 Claims, 5 Drawing Sheets

U.S. PATENT DOCUMENTS

| | | | |
|---|---|---|---|
| 5,742,370 | A | 4/1998 | Kim |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine |
| 5,944,934 | A | 8/1999 | Park |
| 5,952,676 | A | 9/1999 | Sato |
| 5,952,678 | A | 9/1999 | Ashida |
| 5,956,112 | A | 9/1999 | Fujimori et al. |
| 6,001,203 | A | 12/1999 | Yamada et al. |
| 6,011,609 | A | 1/2000 | Kato |
| 6,016,178 | A | 1/2000 | Kataoka |
| 6,016,181 | A | 1/2000 | Shimada |
| 6,055,035 | A | 4/2000 | Von Gutfeld |
| 6,124,917 | A * | 9/2000 | Fujioka et al. .............. 349/153 |
| 6,163,357 | A | 12/2000 | Nakamura |
| 6,219,126 | B1 | 4/2001 | von Gutfeld |
| 6,226,067 | B1 | 5/2001 | Nishiguchi |
| 6,236,445 | B1 | 5/2001 | Foschaar et al. |
| 6,304,306 | B1 | 10/2001 | Shiomi |
| 6,304,311 | B1 | 10/2001 | Egami |
| 6,337,730 | B1 | 1/2002 | Ozaki et al. |
| 6,407,783 | B1 * | 6/2002 | Ohgawara et al. ........... 349/110 |
| 6,414,733 | B1 | 7/2002 | Ishikawa |
| 6,646,689 | B2 * | 11/2003 | Matsuda ....................... 349/1 |
| 6,657,701 | B2 * | 12/2003 | Choo et al. ................. 349/189 |
| 2001/0026349 | A1 * | 10/2001 | Furukawa et al. |
| 2001/0055827 | A1 | 12/2001 | Asakura et al. |

FOREIGN PATENT DOCUMENTS

| | | |
|---|---|---|
| JP | 57088428 | 6/1982 |
| JP | 58027126 | 2/1983 |
| JP | 60164723 | 8/1985 |
| JP | 60217343 | 10/1985 |
| JP | 61007822 | 1/1986 |
| JP | 61055625 | 3/1986 |
| JP | 62-054225 | 3/1987 |
| JP | 62-054228 | 3/1987 |
| JP | 62-054229 | 3/1987 |
| JP | 62089025 | 4/1987 |
| JP | 62090622 | 4/1987 |
| JP | 62-125221 | 8/1987 |
| JP | 62205319 | 9/1987 |
| JP | 62280722 | 12/1987 |
| JP | 63109413 | 5/1988 |
| JP | 63110425 | 5/1988 |
| JP | 63128315 | 5/1988 |
| JP | 63311233 | 12/1988 |
| JP | 03-009549 | 1/1991 |
| JP | 3215828 | 9/1991 |
| JP | 03-255422 * | 11/1991 |
| JP | 05-005890 | 1/1993 |
| JP | 05-036425 | 2/1993 |
| JP | 05-036426 | 2/1993 |
| JP | 05-107533 | 4/1993 |
| JP | 05127179 | 5/1993 |
| JP | 05265011 | 10/1993 |
| JP | 05281557 | 10/1993 |
| JP | 05281562 | 10/1993 |
| JP | 06-018829 | 1/1994 |
| JP | 06051256 | 2/1994 |
| JP | 06-064229 | 3/1994 |
| JP | 06148657 | 5/1994 |
| JP | 6160871 | 6/1994 |
| JP | 06-194637 | 7/1994 |
| JP | 06265915 | 9/1994 |
| JP | 07128674 | 5/1995 |
| JP | 07181507 | 7/1995 |
| JP | 07-275770 | 10/1995 |
| JP | 07-275771 | 10/1995 |
| JP | 08-076133 | 3/1996 |
| JP | 08-110504 | 4/1996 |
| JP | 08095066 | 4/1996 |
| JP | 08106101 | 4/1996 |
| JP | 08-136937 | 5/1996 |
| JP | 08-173874 | 7/1996 |
| JP | 08171094 | 7/1996 |
| JP | 08190099 | 7/1996 |
| JP | 8-248429 | 9/1996 |
| JP | 08240807 | 9/1996 |
| JP | 09-001026 | 1/1997 |
| JP | 09005762 | 1/1997 |
| JP | 09026578 | 1/1997 |
| JP | 09073075 | 3/1997 |
| JP | 09073096 | 3/1997 |
| JP | 09-094500 | 4/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-174924 | 6/1998 |
| JP | 10221700 | 8/1998 |
| JP | 10282512 | 10/1998 |
| JP | 11014953 | 1/1999 |
| JP | 11038424 | 2/1999 |
| JP | 11064811 | 3/1999 |
| JP | 11109388 | 4/1999 |
| JP | 11174477 | 7/1999 |
| JP | 11212045 | 8/1999 |
| JP | 11-262712 | 9/1999 |
| JP | 11-264991 | 9/1999 |
| JP | 11344714 | 12/1999 |
| JP | 2000029035 | 1/2000 |
| JP | 2000-066218 | 3/2000 |
| JP | 2000-093866 | 4/2000 |
| JP | 2001117105 | 4/2001 |
| JP | 2001133794 | 5/2001 |
| JP | 2001142074 | 5/2001 |
| JP | 2001147437 | 5/2001 |
| JP | 2001154211 | 6/2001 |
| JP | 2001-209056 | 8/2001 |
| JP | 2001-209057 | 8/2001 |
| JP | 2001-209058 | 8/2001 |
| JP | 2001255542 | 9/2001 |
| JP | 2001264782 | 9/2001 |
| JP | 2001330840 | 11/2001 |
| JP | 2001356354 | 12/2001 |
| JP | 2002-6325 | 1/2002 |
| JP | 2002014360 | 1/2002 |
| JP | 2002023176 | 1/2002 |
| JP | 2002049045 | 2/2002 |
| JP | 2002-079160 | 3/2002 |
| JP | 2002-080321 | 3/2002 |
| JP | 2002082340 | 3/2002 |
| JP | 2002090759 | 3/2002 |
| JP | 2002090760 | 3/2002 |
| JP | 2002-122870 | 4/2002 |
| JP | 2002107740 | 4/2002 |
| JP | 2002122872 | 4/2002 |
| JP | 2002122873 | 4/2002 |
| JP | 2002-131762 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002080321 | 6/2002 |
| JP | 2002202512 | 7/2002 |
| JP | 2002202514 | 7/2002 |
| JP | 2002214626 | 7/2002 |

| | | | | | |
|---|---|---|---|---|---|
| JP | 2002-229042 | 8/2002 | JP | 2002-323694 | 11/2002 |
| JP | 2002-236276 | 8/2002 | JP | 2002-333628 | 11/2002 |
| JP | 2002-258299 | 8/2002 | JP | 2002-333635 | 11/2002 |
| JP | 2002-236292 | 9/2002 | JP | 2002-333843 | 11/2002 |
| JP | 2002-277865 | 9/2002 | JP | 2002-341329 | 11/2002 |
| JP | 2002-277866 | 9/2002 | JP | 2002-341355 | 11/2002 |
| JP | 2002-277881 | 9/2002 | JP | 2002-341356 | 11/2002 |
| JP | 2002-287156 | 10/2002 | JP | 2002-341357 | 11/2002 |
| JP | 2002-296605 | 10/2002 | JP | 2002-341358 | 11/2002 |
| JP | 2002-311438 | 10/2002 | JP | 2002-341359 | 11/2002 |
| JP | 2002-311440 | 10/2002 | JP | 2002-341362 | 11/2002 |
| JP | 2002-311442 | 10/2002 | KR | 95-25622 | 9/1995 |
| JP | 2002-323687 | 11/2002 | | | |

\* cited by examiner

LIQUID CRYSTAL DISPLAY DEVICE AND METHOD OF MANUFACTURING THE SAME

This application is a divisional of U.S. application Ser. No.: 10/184,075, filed Jun. 28, 2002, now U.S. Pat. No. 7,196,764, which claims the benefit of Korean Patent Application No. P2002-15079 filed on Mar. 20, 2002, each of which are hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display (LCD) device, and more particularly, to a sealant pattern of an LCD device.

2. Discussion of the Related Art

Generally, ultra thin flat panel displays having a display screen with a thickness of several centimeters or less, and in particular, flat panel LCD devices, are widely used in monitors for notebook computers, spacecraft, and aircraft in view of the aspects that such LCD devices have low power consumption and are easy to carry.

Such an LCD device, as shown in FIG. 1, includes a lower substrate 1, an upper substrate 3, and a liquid crystal layer 5. A thin film transistor (TFT) (not shown) and a pixel electrode (not shown) are formed on the lower substrate 1. The upper substrate 3 is formed to oppose the lower substrate 1. A light-shielding layer (not shown), a color filter layer (not shown), and a common electrode (not shown) are formed on the upper substrate 3. The liquid crystal layer 5 is formed between the lower and upper substrates 1 and 3.

A sealant 7 is formed between the lower and upper substrates 1 and 3 to prevent the liquid crystal layer 5 from leaking out.

In the aforementioned LCD device, to form the liquid crystal layer 5 between lower and upper substrates 1 and 3, a vacuum injection method based on capillary phenomenon and pressure difference has been conventionally used. However, such a vacuum injection method has a problem in that it takes long time to inject the liquid crystal over a large panel area, thereby reducing the productivity.

To solve such a problem, a method of applying liquid crystal to one of the substrates has been supposed.

A method of manufacturing an LCD device based on a liquid crystal dropping method will now be described with reference to FIGS. 2A to 2D.

As shown in FIG. 2A, a lower substrate 1 and an upper substrate 3 are prepared. A plurality of gate and data lines (not shown) are formed on the lower substrate 1. The gate lines cross the data lines to define a pixel region. A thin film transistor (not shown) is formed at each crossing point between the gate and data lines. A pixel electrode (not shown) connected with the thin film transistor is formed in the pixel region.

A light-shielding layer (not shown) is formed on the upper substrate 3 to prevent light from leaking out from the gate and data lines and the thin film transistor. Color filter layers of red(R), green(G), and blue(B) are formed on the light-shielding layer, and a common electrode (not shown) is formed on the color filter layers. An alignment film (not shown) is formed on at least one of the lower substrate 1 and the upper substrate 3 to initially align a liquid crystal.

As shown in FIG. 2B, a sealant 7 is formed on the lower substrate 1 and a liquid crystal 5 is dropped thereon, so that a liquid crystal layer is formed. A spacer (not shown) is spread or sprayed onto the upper substrate 3 to maintain a cell gap.

In the method of manufacturing the LCD device based on the liquid crystal application method, a liquid crystal layer is formed on bonded substrates. Therefore, if a thermo-hardening sealant is used as the sealant 7, the sealant 7 heats and expands and flows out of the substrate when it is heated. For this reason, a problem arises in that the liquid crystal 5 is contaminated.

Therefore, in the method of manufacturing the LCD based on the liquid crystal application method, a UV sealant is used as the sealant 7.

As shown in FIG. 2C, the lower substrate 1 is attached to the upper substrate 3.

As shown in FIG. 2D, UV is irradiated through a UV irradiating device 9 so that the sealant 7 is hardened, thereby bonding the lower substrate 1 to the upper substrate 3.

Thereafter, although not shown, a cell cutting process and a final test process are performed.

The aforementioned liquid crystal dropping method has an advantage in that it takes a short time to form the liquid crystal layer as compared with the vacuum injection method because the liquid crystal 5 is directly applied onto the lower substrate 1 before the substrates 1 and 3 are bonded to each other. However, the liquid crystal application method has the following problems.

First, although an amount of the liquid crystal dropped onto the substrate is generally determined considering some factors such as the size of the substrate and a cell gap between both substrates, it is difficult to exactly determine the amount of the liquid crystal applied on the substrate.

Accordingly, if the liquid crystal is applied in an amount less than the required amount, regions of the substrate where the liquid crystal is filled imperfectly, particularly, occur at four corners located farthest from the center of the substrate. If the liquid crystal is dropped excessively, a partial region where the liquid crystal is filled excessively occurs.

This deteriorates uniformity of the cell gap and picture characteristics.

Even if the liquid crystal is applied appropriately, it takes a certain time to spread the liquid crystal from the center part of the substrate to the corners. Accordingly, if the imperfectly filled region occurs as the liquid crystal is not spread to the corner regions before a final test process, the final test process cannot be carried out.

Finally, if the substrate is heated during the process of manufacturing an LCD device, the liquid crystal expands. In this case, a partial region where the liquid crystal is filled excessively also occurs, thereby reducing uniformity of a cell gap.

SUMMARY OF THE INVENTION

Accordingly, the present invention is directed to an LCD device and a method of manufacturing the same that substantially obviates one or more problems due to limitations and disadvantages of the related art.

An advantage of the present invention is to provide an LCD device and a method of manufacturing the same that prevents a liquid crystal from being filled imperfectly or excessively in an active region, thereby obtaining a uniform cell gap and improving picture quality characteristics.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a lower substrate and an upper substrate; a sealant between the lower and upper substrates, the sealant having a portion for controlling a liquid crystal flow at at least two corner regions; and a liquid crystal layer between the lower and upper substrates.

In another aspect of the present invention, a liquid crystal display device includes an upper substrate and a lower substrate attached to one another by a sealant, the sealant and the upper and lower substrates forming an enclosed volume; and liquid crystal in the enclosed volume between the upper and lower substrates, wherein a portion of the sealant forms at least one reservoir outside an active area of the liquid crystal display device.

In another aspect of the present invention, a method of manufacturing a liquid crystal display device includes preparing a lower substrate and an upper substrate; forming a sealant having a portion for controlling a liquid crystal flow in at least two corner regions on one of the lower and upper substrates; applying the liquid crystal on one of the lower and upper substrates; attaching the substrates to each other; and curing the sealant.

In an embodiment of the present invention, an amount of the liquid crystal that is more than sufficient to fill a cell gap between the two substrates is applied to one of the substrates, so as to prevent the liquid crystal from being imperfectly filled in the cell gap between the substrates. Also, the UV sealant is formed on one of the two sustrates to have a part for controlling a liquid crystal flow at corner regions so that a partial region where the liquid crystal is formed excessively does not occur.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which is illustrated in the accompanying drawings. Wherever possible, the same reference numbers will be used throughout the drawings to refer to the same or like parts.

Figure 1:
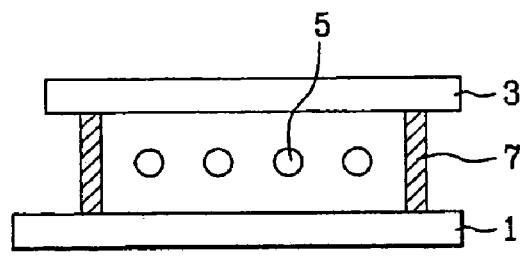
FIG. 1 is a sectional view of a general LCD device.
Figure 2A:
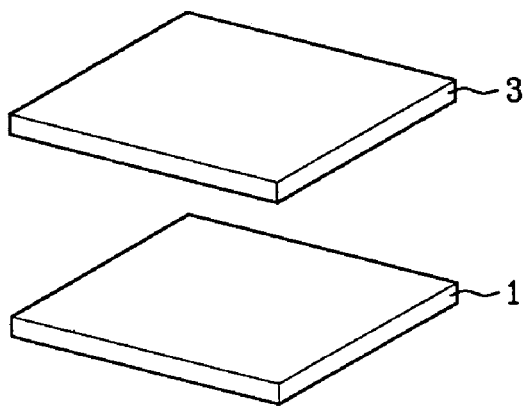
FIGS. 2A to 2D are perspective views illustrating a method of manufacturing an LCD device.
Figure 2B:
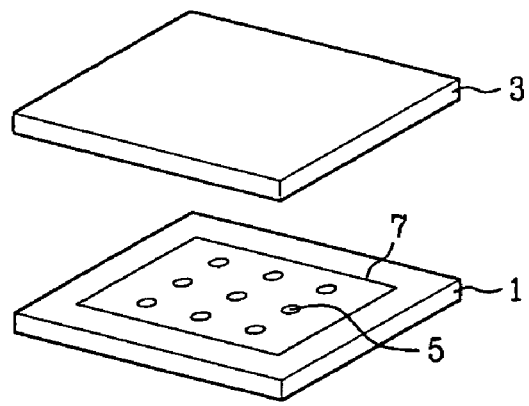
Figure 2C:
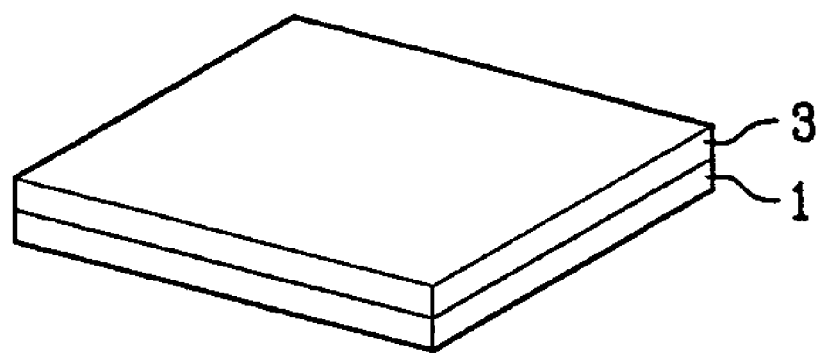
Figure 2D:
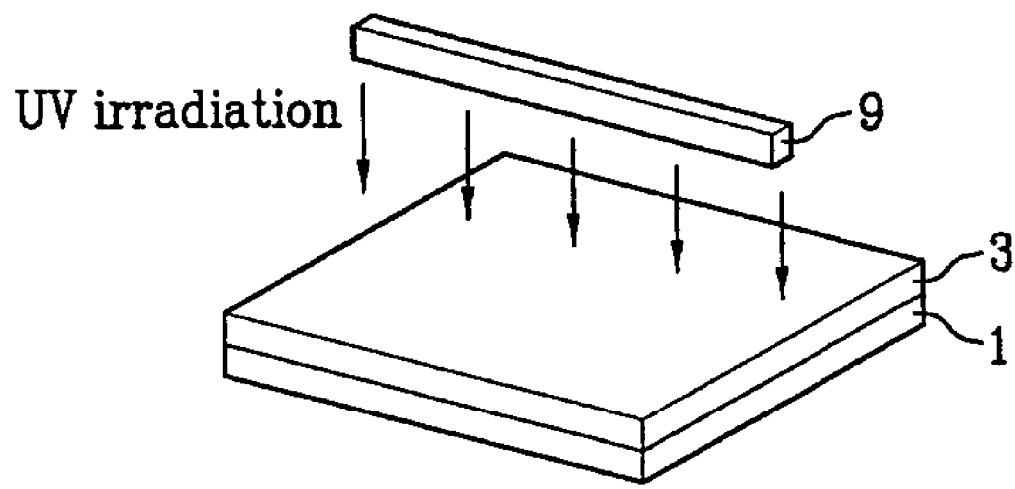
Figure 3A:
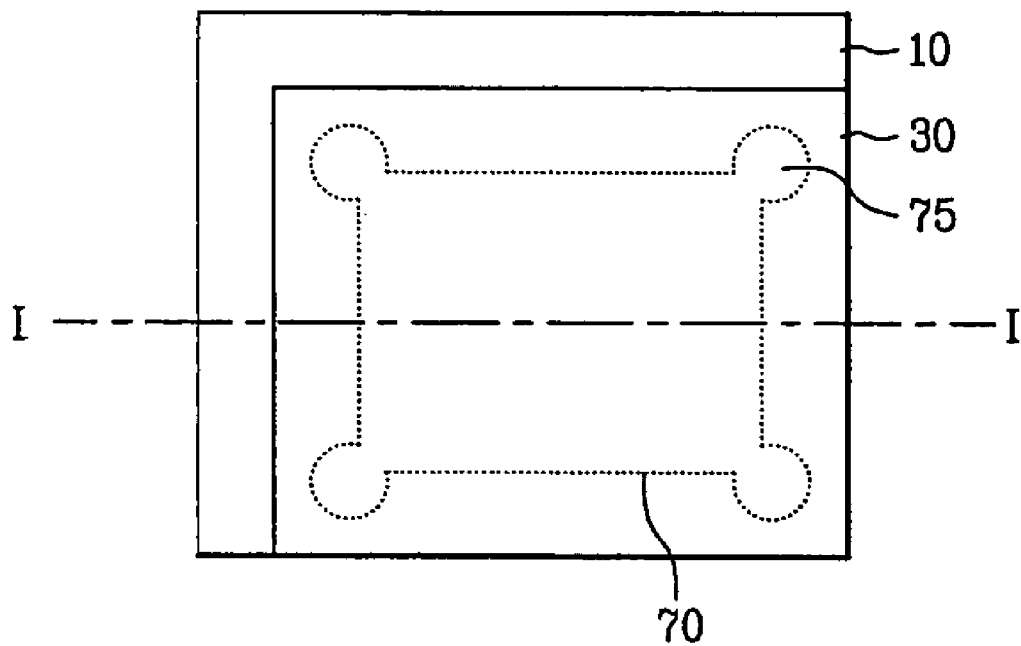
FIG. 3A is a plan view of an LCD device according to the first embodiment of the present invention.
Figure 3B:
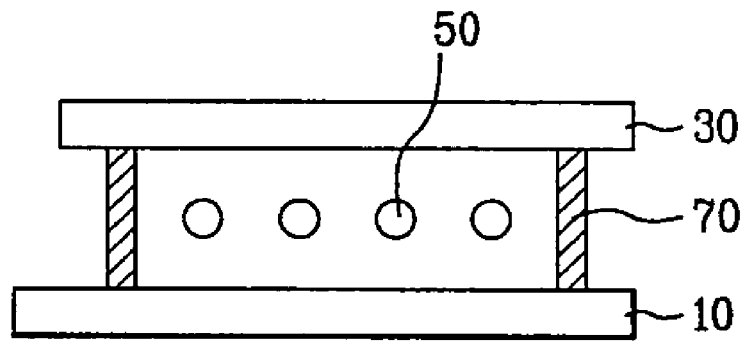
FIG. 3B is a sectional view taken along line I-I of FIG. 3A.

FIG. 3A is a plan view of an LCD device according to the first embodiment of the present invention, and FIG. 3B is a sectional view taken along line I-I of FIG. 3A.

As shown in FIGS. 3A and 3B, an LCD device according to the first embodiment of the present invention includes a lower substrate 10, an upper substrate 30, a sealant 70 that is at least partially curable by ultraviolet (UV) light formed between the lower and upper substrates 10 and 30, and a liquid crystal layer 50 formed within a volume formed by the UV sealant 70 between the lower and upper substrates 10 and 30.

The UV sealant 70 is patterned to form a part 75 for controlling a liquid crystal flow at four corner regions. The part 75 is formed to receive excess liquid crystal from an active region of the LCD device, such as a cavity, reservoir or well. Therefore, if the liquid crystal is applied excessively, i.e., overfilled, the excess liquid crystal enters into the part 75 away from an active region.

Also, even if the liquid crystal expands during a heating process, the excess liquid crystal enters into the part 75 so that overfilling of the liquid crystal in the active region does not occur. If the expanded liquid crystal shrinks, the liquid crystal filled in the part 75 moves to the active region.

The size of the part 75 can appropriately be adjusted and may have various shapes such as a round, triangular, rectangular, polygonal, or any other shape as would be appreciated by one of skill in the art.

Although not shown, a thin film transistor and a pixel electrode are formed on the lower substrate 10. The thin film transistor includes a gate electrode, a gate insulating layer, a semiconductor layer, an ohmic contact layer, and source/drain electrodes.

Although not shown, a light-shielding layer, a color filter layer, and a common electrode are formed on the upper substrate 30. The light-shielding layer shields light leakage from a region other than the pixel electrode. Additionally, an overcoat layer (not shown) may be formed on the color filter layer. In an In-Plane Switching (IPS) mode LCD device, the common electrode is formed on the lower substrate 10.

The part 75 formed by a pattern of the UV sealant 70 corresponds to a region where the light-shielding layer is formed. Therefore, picture quality characteristics are not deteriorated even if the liquid crystal 50 is filled imperfectly in the part 75.

Spacers may be formed between the substrates 10 and 30 to maintain a cell gap. Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to gate lines or data lines. Preferably, the column spacers may be formed of a photosensitive organic resin.

FIGS. 4A to 4D are perspective views illustrating a method of manufacturing an LCD device according to the second embodiment of the present invention.

Although the drawings illustrate only one unit cell, a plurality of unit cells may be formed depending upon the size of the substrate.

Figure 4A:
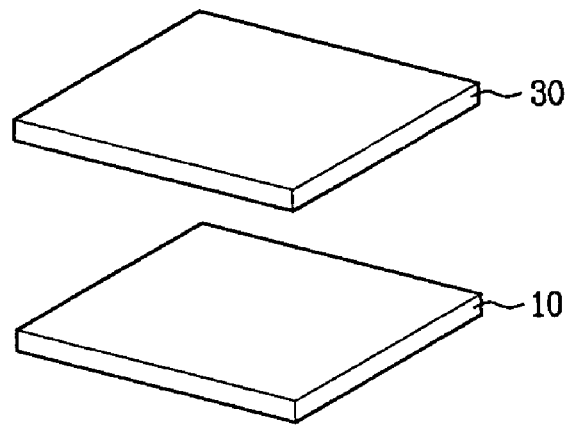
FIGS. 4A to 4D are perspective views illustrating a method of manufacturing an LCD device according to the second embodiment of the present invention.

Referring to FIG. 4A, a lower substrate 10 and an upper substrate 30 are prepared. A plurality of gate and data lines (not shown) are formed on the lower substrate 10. The gate lines cross the data lines to define a pixel region. A thin film transistor having a gate electrode, a gate insulating layer, a semiconductor layer, an ohmic contact layer, source/drain electrodes, and a protection layer is formed at each crossing point of the gate lines and the data lines. A pixel electrode connected with the thin film transistor is formed in the pixel region.

An alignment film (not shown) is formed on the pixel electrode to initially align the liquid crystal. The alignment film may be formed of polyamide or polyimide based compound, polyvinylalcohol (PVA), and polyamic acid by rubbing. Alternatively, the alignment film may be formed of a photosensitive material, such as polyvinvylcinnamate (PVCN), polysilioxanecinnamate (PSCN) or cellulosecinnamate (CelCN) based compound, by using a photo-alignment method.

A light-shielding layer (not shown) is formed on the upper substrate 30 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots (not shown) are formed outside the lower substrate 10 to apply a voltage to the common electrode on the upper substrate 30 after the lower and upper substrates 10 and 30 are bonded to each other. Alternatively, the silver dots may be formed on the upper substrate 30.

In an in plane switching (IPS) mode LCD, the common electrode is formed on the lower substrate like the pixel electrode, and, in operation, an electric field is horizontally induced between the common electrode and the pixel electrode. The silver dots are not formed on the substrates.

A sealant 70 that is at least partially curable by UV light is formed on the upper substrate 30 to have a part 75 for controlling a liquid crystal flow at four corner regions.

The part 75 may have various shapes such as a round, triangular, rectangular, polygonal shape or any other shape as would be appreciated by one of skill in the art with a size may appropriately adjusted according factors such as the level of liquid crystal applied and the size of the substrate.

The UV sealant is formed by a screen printing method or a dispensing method. In the screen printing method, because a screen comes into contact with the substrate, the alignment film formed on the substrate may be damaged. Also, if the substrate has a large area, loss of the sealant increases. In these respects, the dispensing method is preferably used.

Monomers or oligomers each having both ends coupled to the acrylic group, mixed with an initiator are used as the UV sealant 70. Alternatively, monomers or oligomers each having one end coupled to the acrylic group and the other end coupled to the epoxy group, mixed with an initiator are used as the UV sealant 70.

Also, the liquid crystal 50 is applied onto the lower substrate 10 to form a liquid crystal layer. At this time, the amount of the liquid crystal 50 is determined by considering the size of the substrate and a cell gap. Preferably, the liquid crystal 50 is substantially applied in an amount greater than the minimum level sufficient to fill the cell gap.

The liquid crystal 50 may be contaminated if it comes into contact with the UV sealant 70 before the UV sealant 70 is hardened. Accordingly, the liquid crystal 50 may preferably be applied on the central part of the lower substrate 10. In this case, the liquid crystal 50 is gradually spread evenly after the UV sealant 70 is hardened. If the liquid crystal 50 is applied excessively, the liquid crystal 50 enters into the part 75. Thus, the liquid crystal 50 is uniformly distributed in the active region of the substrate, thereby maintaining a uniform cell gap.

Also, if the liquid crystal is applied in an amount (application amount) more than a minimum amount required to fill the cell gap in the active region (minimum amount), it takes a short time to spread the liquid crystal to the corner regions so that the liquid crystal is spread to the active region before the final test process.

Figure 4B:
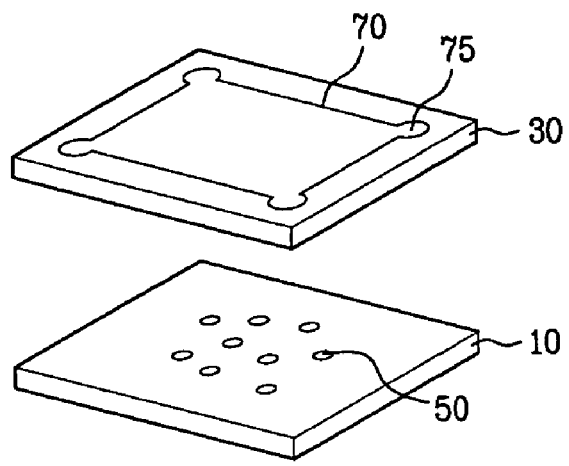

Meanwhile, although FIG. 4B illustrates the process of applying the liquid crystal 50 on the lower substrate 10 and forming the UV sealant 70 on the upper substrate 30, the liquid crystal 50 may be formed on the upper substrate 30 while the UV sealant 70 may be formed on the lower substrate 10.

Alternatively, both the liquid crystal 50 and the UV sealant 70 may be formed on one substrate. In this case, an imbalance occurs between the processing times of the substrate with the liquid crystal and the sealant and the substrate without the liquid crystal and the sealant. For this reason, the manufacturing process time increases. Also, when the liquid crystal and the sealant are formed on one substrate, the substrate may not be cleaned even if the sealant is contaminated before the substrates are attached to each other.

Accordingly, a cleaning process for cleaning the upper substrate 30 may additionally be provided after the UV sealant 70 is formed on the upper substrate 30.

Meanwhile, spacers may be formed on either of the two substrates 10 and 30 to maintain a cell gap. Preferably, the spacers may be formed on the upper substrate 30.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, the column spacers may be used for the large sized substrate since the ball spacers may cause an uneven cell gap for the large sized substrate. The column spacers may be formed of a photosensitive organic resin.

Figure 4C:
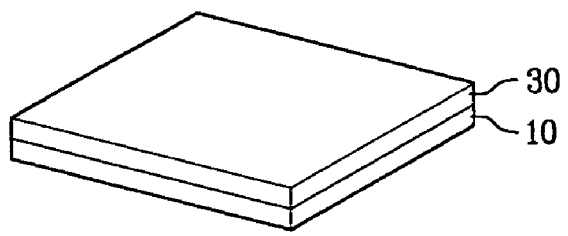

Referring to FIG. 4C, the lower substrate 10 and the upper substrate 30 are attached to each other by the following processes. First, one of the substrates having the liquid crystal applied thereon is placed at the lower side. The other substrate is placed at the upper side by turning by 180 degrees so that its portion having certain layers faces into the surface of the lower substrate having certain layers. Thereafter, the substrate at the upper side is pressed, so that both substrates are attached to each other. Alternatively, the space between the substrates may be maintained under the vacuum state so that both substrates are attached to each other by releasing the vacuum state.

Figure 4D:
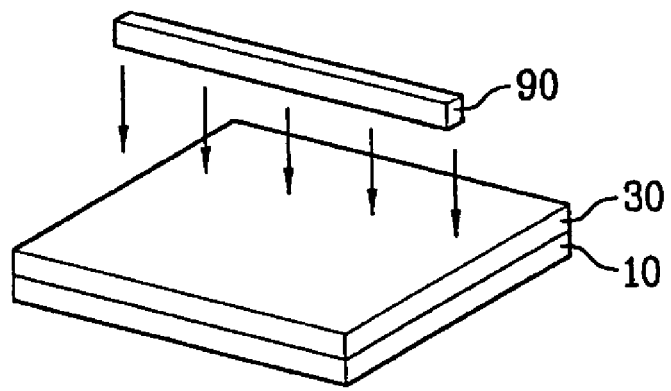

Then, as shown in FIG. 4D, UV light is irradiated upon the attached substrates through a UV irradiating device 90. Upon irradiating the UV, monomers or oligomers activated by an initiator constituting the UV sealant 70 are polymerized and hardened, thereby bonding the lower substrate 10 to the upper substrate 30.

If monomers or oligomers each having one end coupled to the acrylic group and the other end coupled to the epoxy group, mixed with an initiator are used as the UV sealant 70, the epoxy group is not completely polymerized. Therefore, the sealant may have to be additionally heated at about 120° C. for one hour after the UV irradiation, thereby hardening the sealant completely.

In the UV irradiation, if the UV light is irradiated upon the entire surface of the attached substrates, the UV light may deteriorate characteristics of devices such as a thin film transistor on the substrate and change a pre-tilt angle of an alignment film formed for the initial alignment of the liquid crystal.

Figure 4E:
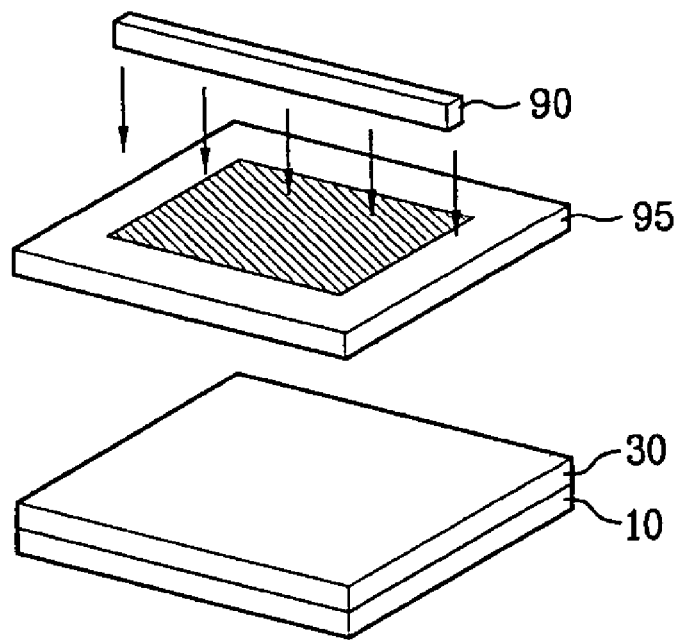
FIG. 4E is a perspective view illustrating a process of irradiating UV in the method of manufacturing an LCD device according to the present invention.

Therefore, as shown in FIG. 4E, the UV light is irradiated in a state that an active region in the UV sealant 70 is covered with a mask 95.

Although not shown, the bonded substrates are cut into a unit cell.

In the cutting process, a cutting line is formed on a surface of the substrates with a pen or cutting wheel of a material that has a hardness greater than that of glass, e.g., diamond, and then the substrate is cut along the cutting line by mechanical impact or breaking process. Thus, a plurality of unit cells can be obtained simultaneously.

Alternatively, the scribing process and the breaking process may simultaneously be performed using a pen or cutting wheel of a material that has a hardness greater than that of glass, thereby obtaining a unit cell. In this case, space occupied by cutting equipment that cuts the glass is reduced over the space occupied by equipment required to scribe and break the glass and the overall cutting process time is also reduced over the combined scribe and break process.

As aforementioned, the LCD and the method of manufacturing the same according to the present invention have the following advantages.

Since the liquid crystal the level of liquid crystal applied to the substrate can be greater than the amount required to cover the active area of the LCD panel and the sealant is formed to have the part for controlling a liquid crystal flow, the liquid crystal is filled appropriately without any imperfections caused by an overfill in the active area. Thus, a uniform cell gap can be maintained.

Furthermore, even if the liquid crystal expands or shrinks, for example, during the heating process, the liquid crystal exits or enters the part for controlling a liquid crystal flow, thereby avoiding any defect in a cell gap that may occur.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    an upper substrate and a lower substrate attached to one another by a UV sealant, the sealant and the upper and lower substrates forming an enclosed volume; and
    liquid crystal in the enclosed volume between the upper and lower substrates;
    wherein a portion of the UV sealant forms four reservoirs outside four corners of an active area of the liquid crystal display device, and the four reservoirs are diagonally facing each other,
    wherein the UV sealant is formed into a closed pattern, the closed pattern including:
    a pair of first linear edges and a pair of second linear edges, wherein the pair of second linear edges are non-parallel to the pair of first linear edges and the four reservoirs are within the closed pattern,
    wherein each reservoir is between the first and second linear edges, wherein one end of the each reservoir is connected to the first linear edge and the other end of the each reservoir is connected to the second linear edge.

2. The liquid crystal display device of claim 1, wherein the reservoir has a round shape.

3. The liquid crystal display device of claim 1, further comprising a thin film transistor and a pixel electrode on the lower substrate.

4. The liquid crystal display device of claim 3, further comprising a common electrode on the lower substrate.

5. The liquid crystal display device of claim 1, further comprising a light-shielding layer and a color filter layer on the upper substrate.

6. The liquid crystal display device of claim 5, wherein a portion of the light-shielding layer corresponds to at least one portion of the sealant for controlling the liquid crystal flow.

7. The liquid crystal display device of claim 5, further comprising a common electrode on the upper substrate.

8. The liquid crystal display device of claim 1, further comprising spacers between the lower and upper substrates.

* * * * *